(12) United States Patent
Churchill

(10) Patent No.: US 10,843,282 B2
(45) Date of Patent: Nov. 24, 2020

(54) OSCILLATING BLADE WITH UNIVERSAL ARBOR ENGAGEMENT PORTION

(71) Applicant: Imperial Blades, Sun Prairie, WI (US)

(72) Inventor: Gregory C. Churchill, Portage, WI (US)

(73) Assignee: Imperial Blades, Sun Prairie, WI (US)

( * ) Notice: Subject to any disclaimer, the term of this patent is extended or adjusted under 35 U.S.C. 154(b) by 0 days.

(21) Appl. No.: 15/678,850

(22) Filed: Aug. 16, 2017

(65) Prior Publication Data

US 2019/0054552 A1    Feb. 21, 2019

(51) Int. Cl.
  *B23D 61/00* (2006.01)
(52) U.S. Cl.
  CPC .................................. *B23D 61/006* (2013.01)
(58) Field of Classification Search
  CPC ...................................................... B23D 61/006
  See application file for complete search history.

(56) References Cited

U.S. PATENT DOCUMENTS

| | | |
|---|---|---|
| 6,678,959 B1 | 1/2004 | Phillip et al. |
| 6,782,781 B2 | 8/2004 | Rack |
| 7,001,403 B2 | 2/2006 | Hausmann et al. |
| D525,707 S | 7/2006 | Küllmer et al. |
| 7,691,106 B2 | 4/2010 | Schenberger et al. |
| D639,833 S | 6/2011 | Inkster |
| 7,997,586 B2 * | 8/2011 | Ziegler ............... B24B 23/04 279/7 |
| 8,216,262 B2 | 7/2012 | O'Donoghue |
| D678,367 S | 3/2013 | Inkster |
| D681,081 S | 4/2013 | Neal, Jr. et al. |
| D681,082 S | 4/2013 | Neal, Jr. et al. |
| D685,826 S | 7/2013 | Inkster |
| 8,518,045 B2 | 8/2013 | Szanto |
| 8,568,204 B2 | 10/2013 | Steiger et al. |
| 8,636,739 B2 | 1/2014 | Fisher et al. |
| 8,672,943 B2 | 3/2014 | Fisher et al. |
| 8,685,028 B2 | 4/2014 | Kim |
| 8,875,611 B2 | 11/2014 | Mann |
| 9,072,526 B2 | 7/2015 | Carusillo |
| 9,192,390 B2 | 11/2015 | Delrio et al. |
| D762,751 S | 8/2016 | Bernardy |
| 9,707,634 B2 | 7/2017 | Grolimund et al. |

(Continued)

FOREIGN PATENT DOCUMENTS

| | | |
|---|---|---|
| CH | 703107 A1 | 11/2011 |
| CN | 204209649 U | 3/2015 |

(Continued)

OTHER PUBLICATIONS

International Search Report and Written Opinion for PCT/IB2018/056162, dated Dec. 5, 2018, 13 pages.

(Continued)

*Primary Examiner* — Stephen Choi
(74) *Attorney, Agent, or Firm* — Smith Law Office; Jeffry W. Smith

(57) ABSTRACT

An oscillating blade for attachment to and use with an oscillating power tool, and the blade includes, an anchor with a tool arbor engagement portion defined by a side wall and a cap wall, and a locking point joined to the tool arbor engagement portion for engaging a corresponding lug on a power tool.

28 Claims, 8 Drawing Sheets

(56) References Cited

U.S. PATENT DOCUMENTS

| | | | |
|---|---|---|---|
| 9,848,900 | B2 | 12/2017 | Witt et al. |
| 10,065,248 | B2 | 9/2018 | Klabunde et al. |
| 2001/0006017 | A1 | 7/2001 | Osada et al. |
| 2002/0104421 | A1 | 8/2002 | Wurst |
| 2005/0065530 | A1 | 3/2005 | Stauch et al. |
| 2005/0178261 | A1 | 8/2005 | Thomaschewski |
| 2008/0172890 | A1 | 7/2008 | Shetterly |
| 2008/0201964 | A1 | 8/2008 | Camargo et al. |
| 2009/0013540 | A1 | 1/2009 | Borne |
| 2009/0320299 | A1 | 12/2009 | Kuhn et al. |
| 2010/0288099 | A1 | 11/2010 | Steiger |
| 2011/0030524 | A1 | 2/2011 | Inkster |
| 2013/0331013 | A1 | 12/2013 | Neal, Jr. et al. |
| 2014/0082948 | A1 | 3/2014 | Staub |
| 2014/0116224 | A1 | 5/2014 | Kern et al. |
| 2014/0190328 | A1 | 7/2014 | Karlen |
| 2014/0325855 | A1 | 11/2014 | Bozic |
| 2015/0020671 | A1 | 1/2015 | Meindorfer |
| 2015/0063933 | A1 | 3/2015 | Faessler et al. |
| 2015/0273706 | A1 | 10/2015 | Martin |
| 2016/0199919 | A1* | 7/2016 | Klabunde ............. B23B 31/008 279/141 |
| 2016/0257010 | A1 | 9/2016 | Jones |
| 2016/0288288 | A1* | 10/2016 | Klabunde ................ B27B 5/32 |
| 2017/0028525 | A1 | 2/2017 | Bek et al. |
| 2017/0182570 | A1* | 6/2017 | Dvorak ................. B23D 51/00 |
| 2017/0348780 | A1 | 12/2017 | Zhang et al. |
| 2018/0029190 | A1* | 2/2018 | Nagy ....................... B24B 23/04 |
| 2018/0200812 | A1* | 7/2018 | Kaye, Jr. .............. B23D 61/006 |

FOREIGN PATENT DOCUMENTS

| | | |
|---|---|---|
| CN | 204209650 U | 3/2015 |
| CN | 105196260 A | 12/2015 |
| CN | 205057976 U | 3/2016 |
| CN | 105522220 A | 4/2016 |
| CN | 20532080 U | 6/2016 |
| CN | 105904414 A | 8/2016 |
| CN | 205685271 U | 11/2016 |
| CN | 106272268 A | 1/2017 |
| CN | 206241375 U | 6/2017 |
| DE | 19613538 C1 | 7/1997 |
| DE | 10100630 C1 | 6/2002 |
| DE | 202011108736 U1 | 6/2012 |
| DE | 102013112888 A1 | 5/2015 |
| DE | 402015100781-0016 | 10/2015 |
| EM | 001638099-0004 | 1/2010 |
| EM | 001724295-0005 | 6/2010 |
| EM | 001965286-0001 | 1/2012 |
| EM | 002067549-0049 | 7/2012 |
| EM | 001389860-0001 | 11/2013 |
| EM | 002418616-0005 | 3/2014 |
| EM | 002758342-0011 | 8/2015 |
| EP | 2808137 A1 | 12/2014 |
| EP | 2777856 B1 | 5/2016 |
| GB | 2357058 A | 6/2001 |
| GB | 2359509 B | 3/2002 |
| GB | 2457249 A | 8/2009 |
| WO | 03/028966 A2 | 4/2003 |
| WO | 03/041920 A2 | 5/2003 |
| WO | 2004/105623 A1 | 12/2004 |
| WO | 2006/050310 A1 | 5/2006 |
| WO | 2008/151866 A1 | 12/2008 |
| WO | 2011/038979 A1 | 4/2011 |
| WO | 2011/044615 A1 | 4/2011 |
| WO | 2011/102776 A1 | 8/2011 |
| WO | 2013/091965 A1 | 6/2013 |
| WO | 2013/113432 A1 | 8/2013 |
| WO | 2014/150560 A2 | 9/2014 |
| WO | 2014/159674 A1 | 10/2014 |
| WO | 2015/048880 A1 | 4/2015 |
| WO | 2016/132320 A1 | 8/2016 |
| WO | 2019/035025 A1 | 2/2019 |

OTHER PUBLICATIONS

Stryker Replacement Blades, in public use, on sale, or otherwise available to the public in 2016, https://www.microaire.com/Pages/ItemClass_Catalog.aspx?ItemClassNo=55, 2 pages.

Saw Blades, in public use, on sale, or otherwise available to the public in 2016, http://www.atlanticsurgical.ie/product/saw-blades/ , 3 pages.

De Soutter Replacement Saw Blades, in public use, on sale, or otherwise available to the public in 2016, http://www.barbermedical.com/de-soutter-replacement-saw-blades.html, 2 pages.

KM-3231SS Sterile Sternum Saw Blade, in public use, on sale, or otherwise available to the public in 2016, http://busamedical.com/news-events/km-3231ss-available-now/, 2 pages.

"2-1 / 2 In. StarlockPlus® Bi-Metal Plunge Cut Blade, in public use, on sale, or otherwise available to the public in 2016, https://www.boschtools.com/us/en/boschtools-ocs/starlockplus-multi-tool-cuttingacccessories-osp212f-142620-p/, 5 pages.".

"1-1 / 4 In. StarlockPlus® High-Carbon Steel Plunge Cut Blade, in public use, on sale, or otherwise available to the public in 2016, https://www.boschtools.com/us/en/boschtools-ocs/starlockplus-multi-tool-cuttingaccessories-osp114-142614-p/, 5 pages.".

Ryker Hardware 15 Piece Variety Pack of Quick Release Oscillating Saw Blades—For Wood and Metal, in public use, on sale, or otherwise available to the public before 2017, https://www.rykerhardware.com/collections/all-products/products/15-piece-universal-quick-release-oscillating-multitool, 6 pages.

DeWalt Oscillating Carbide Grout Removal Blade—DWA4219, in public use, on sale, or otherwise available to the public before 2017, https://www.dewalt.com/products/accessories/oscillating-accessories/oscillating-carbide-grout-removal-blade/dwa4219, 4 pages.

INTEGRA® Tools Platinum Blades™ Piece Flooring Tile and Grout Blade Pack Oscillating MutliTool Blades, in public use, on sale, or otherwise available to the public before 2017, https://platinumsupplypro.com/products/copy-of-Integra-tools-platinum-blades-3-piece-flooring-tile-and-grout-blade-pack-oscillating-multitool-blades, 4 pages.

XXGO Universal Carbide Semicircle Finger Grit Grout Grinding Removal and Rasp Oscillating Multi Tool Blades Pack of 2, in public use, on sale, or otherwise available to the public before 2017, https://www.wantitall.co.za/tools/xxgo-universal-carbide-semicircle-finger-grit-grout-grinding-removal-and-rasp-oscillating-multi-tool_b06ww9qcxw, 5 pages.

MM500 1/8" Grout Removal Blade, in public use, on sale, or otherwise available to the public before 2017, https://www.dremel.com/en_US/products/-/show-product/accessories/mm500-1-8-grout-removal-blade, 2 pages.

* cited by examiner

US 10,843,282 B2

1

OSCILLATING BLADE WITH UNIVERSAL ARBOR ENGAGEMENT PORTION

FIELD AND BACKGROUND OF THE INVENTION

The present invention is generally directed to oscillating blades used with hand-held oscillating power tools, and more particularly to an oscillating blade with a universal tool arbor engagement portion for attaching the oscillating blade to a variety of oscillating power tool arbor shapes and connecting devices.

Oscillating tools are hand-held electrically or air powered devices that apply or transfer torque to an oscillating blade. The blade includes an anchor joined to the tool and a cutting edge that is moved in an oscillating fashion and cuts material into which the blade edge is brought into contact.

Oscillating blades are well known, and include bodies with cutting edges and anchor portions. The anchor portions are typically dedicated designs to match arbor and anchor shapes of particular tool manufacturers. Some tool manufacturers manufacture oscillating blades to fit their tools specifically, and the blades cannot be used with the oscillating tools of other manufacturers. Some blade manufacturers have developed blade designs that can be used with a variety of oscillating tools. For example, the anchor portions are perforated with a variety of hole shapes and orientations to match arbor anchor projections from different tool manufacturers.

In some designs, the anchor positions have been raised from the blade bodies to define a "bottle cap" design common with some manufacturers. In others, arbors of the oscillating tools project axially through a hole in the anchor portions, while others are inserted through openings in the backs of the anchor portions. To accommodate both styles, some blade anchor portions are shaped with central arbor holes and a rearwardly open arbor slot or opening, so that the blades can be attached regardless of tool arbor design.

Nonetheless, as tools and arbor designs continue to change, not all blades can be used with all arbor or tool designs. Further, torque transfer from tool arbors and blade anchor designs can be inefficient. Thus, there is a need for an oscillating blade with an anchor portion that is not only adaptable to various tools designs, but is an improvement over the known attachment methods.

SUMMARY OF THE INVENTION

In accordance with the present invention, an oscillating blade is provided having: an anchor disposed at least partially in a first plane; a working portion joined to the anchor; a tool arbor engagement portion joined to the anchor and having a side wall extending away from the first plane, and a cap wall joined to the side wall and disposed at least partially in a second plane, and the side wall and the cap wall define an arbor opening; and a lock point joined to and extending outwardly from the side wall.

The oscillating blade side wall can be substantially perpendicular to the first plane or be disposed at an angle less than 90°. The side wall can define an arcuate shape, and/or be formed integrally with the anchor.

The oscillating blade cap wall can define an arbor engagement aperture and/or define a plurality of arbor engagement apertures extending substantially radially outwardly from the arbor opening or a radial engagement slot.

2

The oscillating blade lock point can extend substantially radially outwardly from the side wall, and various numbers of lock points can be used.

The oscillating blade can also include a cutting edge joined to the working portion. Also, the oscillating blade anchor working portion can be disposed in a third plane.

Further improvements and features of the present invention are described below.

DETAILED DESCRIPTION OF THE INVENTION

Figure 1:
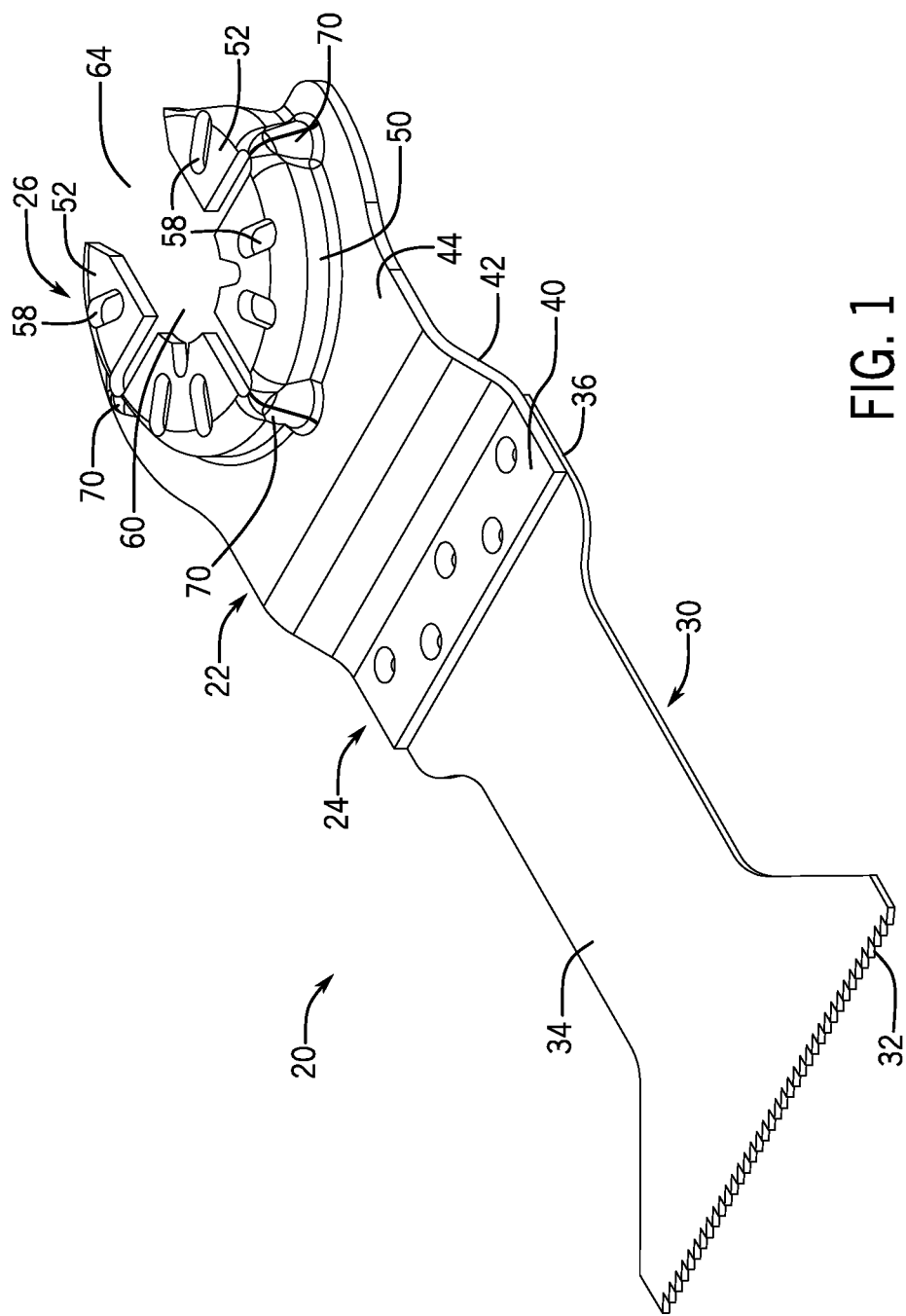
FIG. 1 is a perspective view of oscillating blade in accordance with the present invention.

In the following detailed description of the drawings, the same reference numeral will be used for the same or similar element in each of the figures.

In accordance with the present invention, as seen in FIGS. 1 through 8, there are depicted various embodiments of oscillating blades 20, each having an anchor 22 with a working portion 24 and a tool arbor engagement portion 26. The oscillating blade 20 in each embodiment is sized and shaped as a replaceable cutting or abrading implement for attachment to an oscillating tool described in more detail below.

The oscillating blade 20 anchor 22 provides a foundation to which a blade body 30 can be joined. FIGS. 1 through 4 illustrate that the blade body 30 includes saw teeth 32, which can be specific for the type of material to be cut or a more generic type of saw teeth to cut a variety of materials. The blade body 30 could also be an abrasive material for abrading materials such as plaster, tile grout, or other types of materials. (FIGS. 5 through 8 illustrate anchors 22, but for simplicity, no blade body is illustrated.)

The illustrated blade body 30 includes the saw teeth 32, a shank portion 34, and a connecting end 36, which is joined to the anchor 22 in any suitable manner such as the projection welding technique illustrated. The blade body 30 can be made of any suitable material for the tasks to which it will be applied. It can also have any desired shape including the illustrated shape.

The anchor 22 preferably has an attachment portion 40, a ramp 42, and a base 44. The anchor 22 can be made of any suitable material, including materials that are the same as or different from the blade body 30. The illustrated shape of the anchor 22 working portion 24 is also optional, but preferred, because it provides a generic platform to which a variety of blade bodies 30 can be attached.

As stated above, the attachment portion 40 is attached to the blade body 30. The ramp 42 is optional, but it provides clearance from the oscillating tool and improved access to a material to be cut. The ramp 42 could be omitted altogether or replaced with other shapes or extensions that provide tool clearance and access to the materials to be cut.

The base 44 is preferably an essentially flat portion of the oscillating blade 20 and it is at least partially disposed in a first plane, below which (as illustrated) are the ramp 42, and the attachment portion 40. The base 44 could be other shapes and include portions that are not in the first plane, but the base 44 has at least a portion that is in a different plane than the tool arbor engagement portion 26.

Extending upwardly from the base 44 (and the first plane) is the tool arbor engagement portion 26 of the present invention. The tool arbor engagement portion 26 includes at least a side wall 50 and a cap wall 52. The side wall 50 preferably extends away from the base 44 (and the first plane) at an angle that is preferably as close to 90° as possible while still providing a release angle from a blade forming or stamping tool. (Not illustrated). Thus, the angle of the side wall 50 is preferably "essentially 90°" from the base 44 to leave only enough of an angle for being released from a die, stamp or other forming device. Nonetheless, the departure angle of the side wall 50 could be other angles less than 90°, as well, so that it matches a corresponding mounting element on an oscillating power tool.

At least a portion of the cap wall 52 is disposed in a second plane that is spaced apart from the first plane. The size and shape of the cap wall 52 are selected to correspond to a clamping mechanism on a power tool to which the oscillating blade 20 will be attached, so portions of the cap wall 52 can be outside of the second plane.

In the illustrated embodiment, the attachment portion 40 and the blade body 30 are preferably disposed in a third plane spaced apart from the first and second planes, but other spacing arrangements and blade configurations are possible.

The cap wall 52 preferably defines a number of apertures 58 that are sized, shaped, and disposed to mate with connecting projections on an oscillating power tool connection device. A central arbor hole 60 is also provided, so that a power tool arbor can be inserted (downward, as illustrated) through the central arbor hole 60 for assembly. The hole 60 is positioned to be substantially concentric with a drive axis of the arbor.

In the embodiments illustrated in FIGS. 1 through 6, both the side wall 50 and the cap wall 52 define an arbor opening 64 through which an arbor can be inserted as the oscillating blade 20 is moved laterally into the oscillating tool for attachment. The combination of the central arbor hole 60 with the arbor opening 64 allows the oscillating blade 20 to be used with a variety of different oscillating tool arbor and connection device arrangements.

Figure 2:
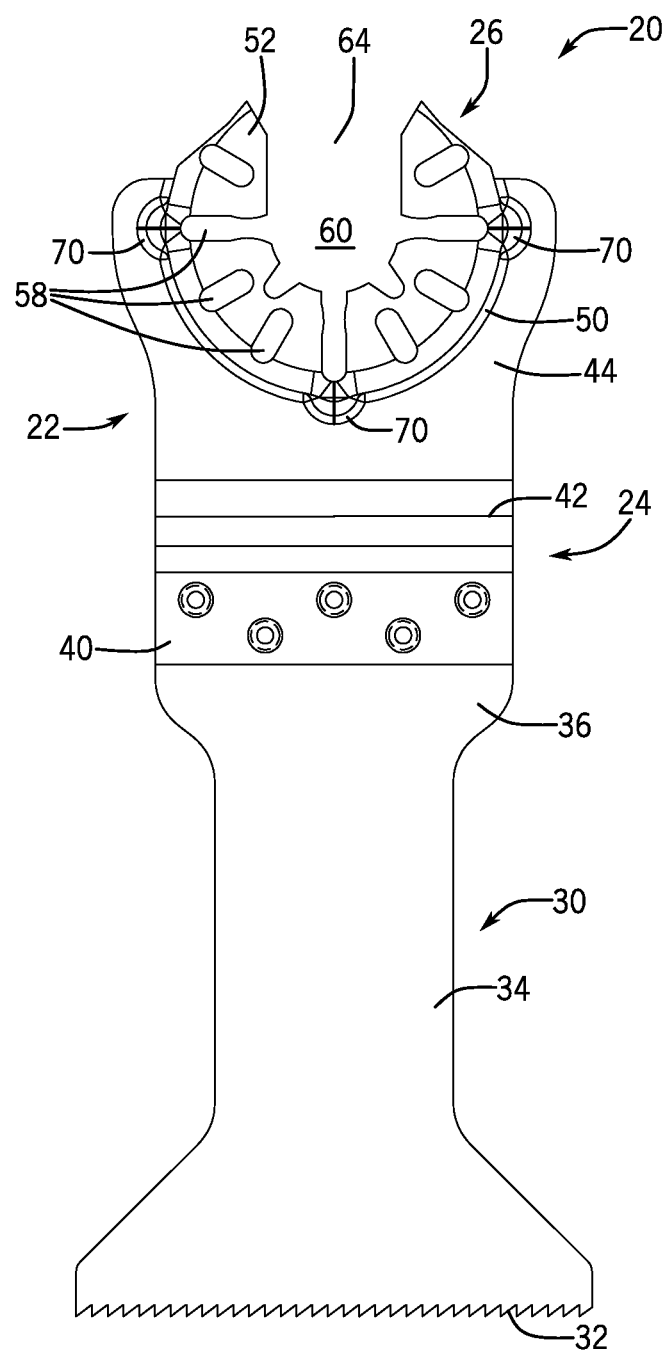
FIG. 2 is a top view of the oscillating blade of FIG. 1.
Figure 3:
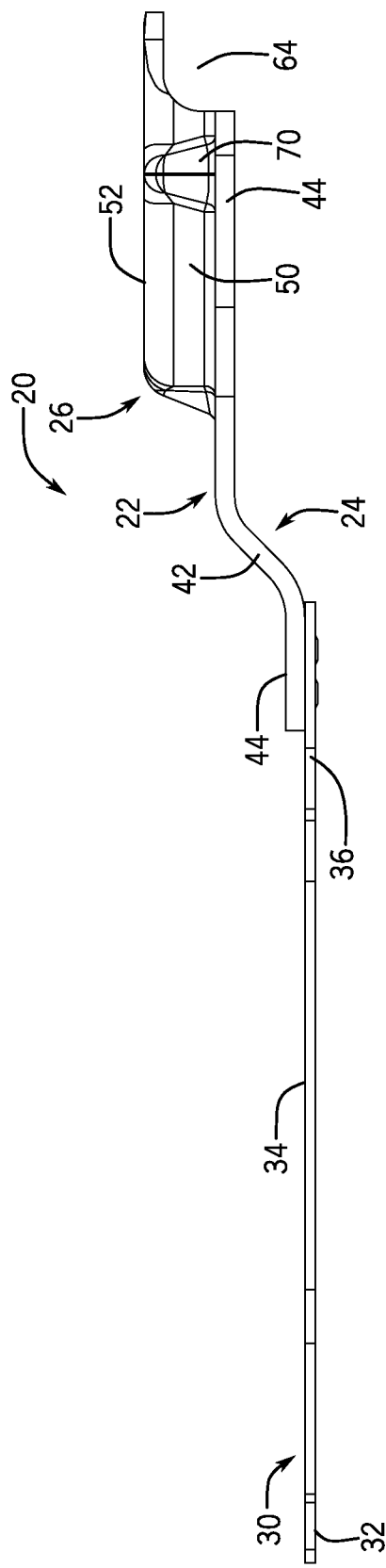
FIG. 3 is a side view of the oscillating blade of FIG. 1.
Figure 4:
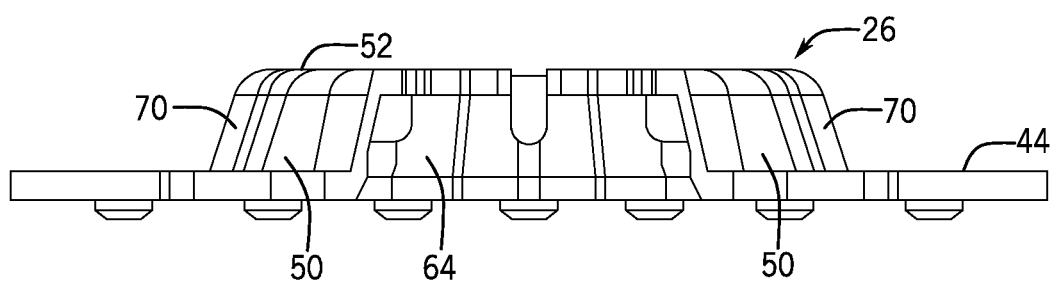
FIG. 4 is a rear view of the oscillating blade of FIG. 1.
Figure 5:
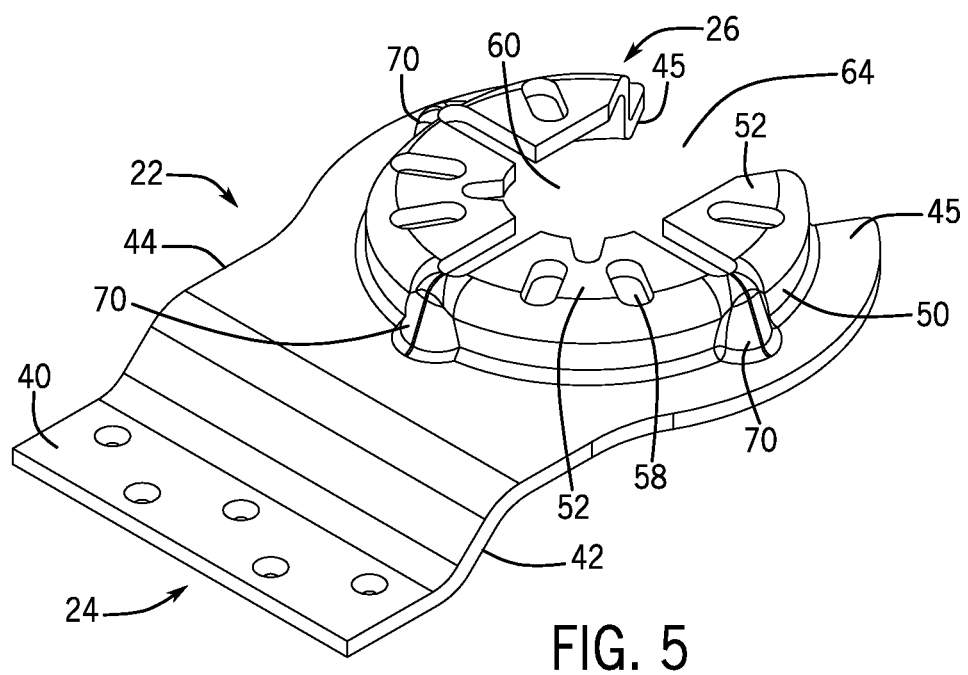
FIG. 5 is a perspective view of a second embodiment of an oscillating blade anchor in accordance with the present invention.
Figure 6:
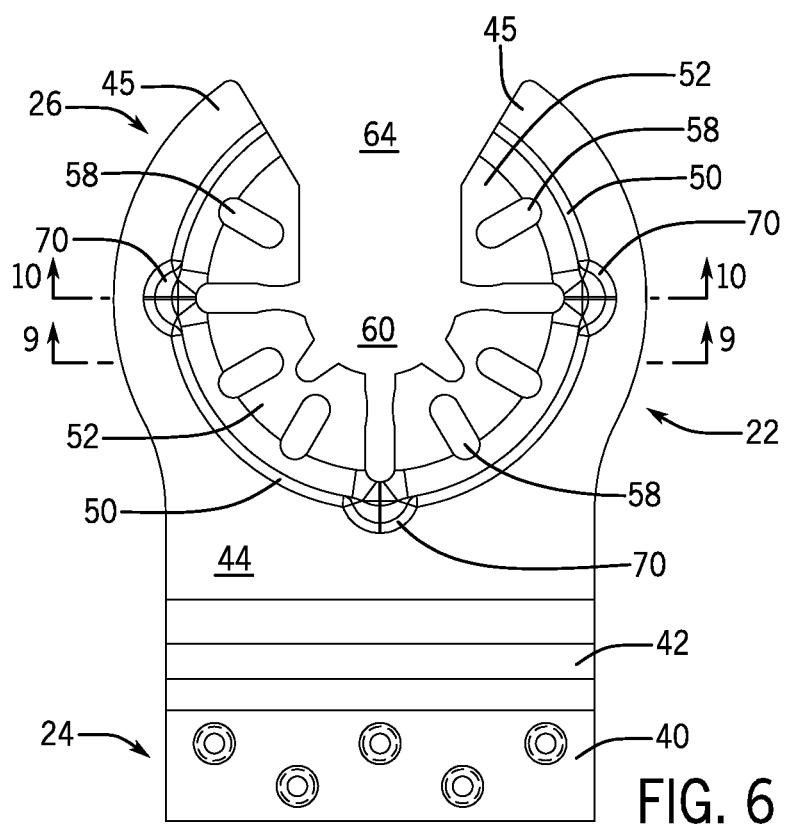
FIG. 6 is a plan view of the second blade anchor embodiment of FIG. 5.

The arbor opening 64 of the first embodiment (FIGS. 1 through 4) is shaped differently from the arbor opening 64 of the second embodiment (FIGS. 5 and 6), as best seen in a comparison of plan view FIG. 2 and FIG. 6. For example, the base 44 of the second embodiment extends rearwardly to include a portion 45, for additional stability. Similarly, (as seen in FIGS. 5 and 6) the side wall 50 of the second embodiment extends rearwardly to the arbor opening 64, whereas the first embodiment (FIGS. 1 through 4) has a side wall 50 that terminates at approximately the same location as the corresponding base 44.

Figure 7:
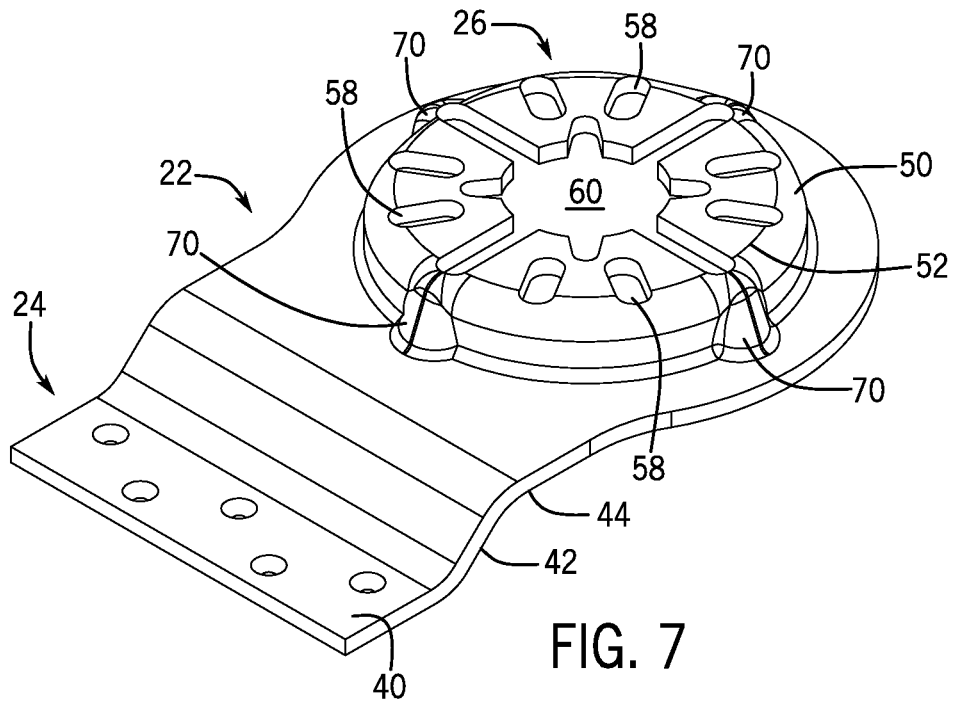
FIG. 7 is a perspective view of a third embodiment of an oscillating blade anchor in accordance with the present invention.
Figure 8:
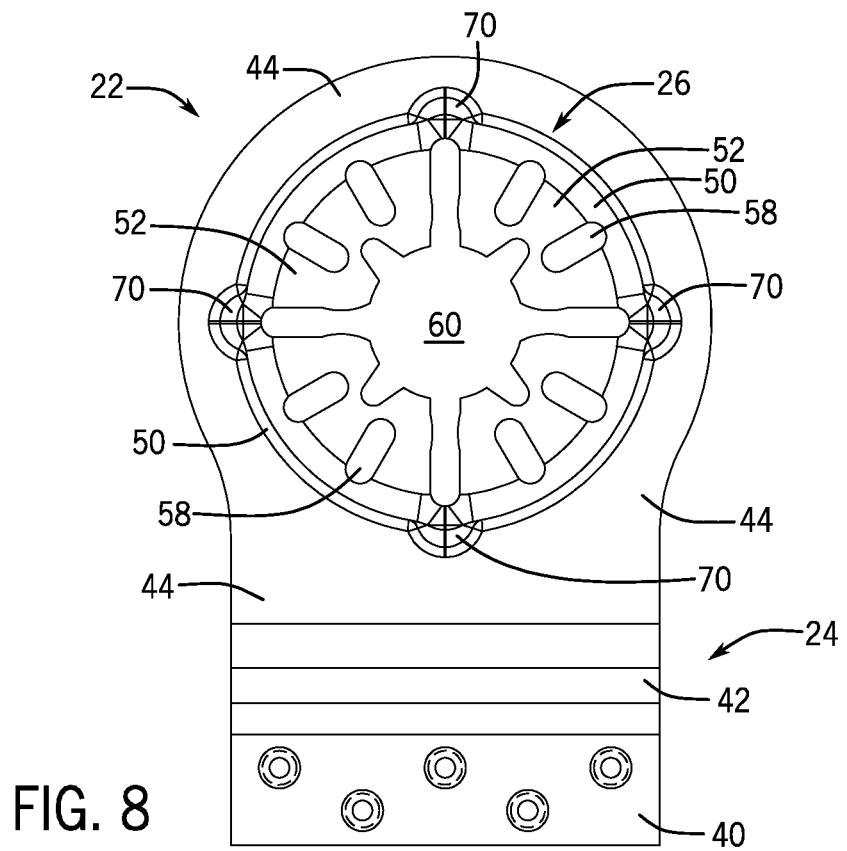
FIG. 8 is a plan view of the third blade anchor embodiment of FIG. 7.

In the embodiment illustrated in FIGS. 7 and 8, there is central arbor hole 60, but no rear arbor opening 64. This design is slightly less adaptable to some oscillating machines, but this configuration mates with specific tools for efficient torque transfer from an arbor to the tool arbor engagement portion 26. In this embodiment, the base 44, the side wall 50, and the cap wall 52 are closed in the back of the tool arbor engagement portion 26.

The oscillating blade 20 further includes at least one lock point 70 to engage a corresponding recess in some oscillating power tools connection devices. In such devices, a clamp portion is secured to the top of the tool arbor engagement portion 26, and described below. As illustrated, the oscillating blade 20 includes three lock points 70 joined to or formed in the side wall 50, but other quantities can be used to mate with any desired oscillating power tool connection device. Due to the efficiency of power transfer from the power tool arbor to the oscillating blade 20 through the lock point(s) 70, there can be fewer lock points 70 than the power tool has mating recesses, so it is unnecessary for the blade 20 to include an exact match between lock points 70 and the mating lugs of the oscillating power tool. Nonetheless, the third embodiment (FIG. 8) illustrates an additional lock point 70 in the rear.

Preferably, the lock points 70 are formed in the side wall 50, but other means for forming the lock points 70 can be used, such as joining separate parts to the side wall 50. As illustrated, the lock points 70 are formed of the same material as the rest of the side wall 50, but the lock points 70 can be made of any material and/or be coated with materials that enhance the interface between the lock points 70 and the oscillating power tool connection device. Also, preferably, the lock point 70 is sized and shaped to mate with a snap fit with recesses in the oscillating power tool connection device. A snap fit provides an audible and tactile indication of proper engagement, as well as a snug interface for efficient and reliable power transfer. The blade 20 with such an arrangement is also easily removed from the recess because it is tapered, as seen in the figures.

Figure 9:
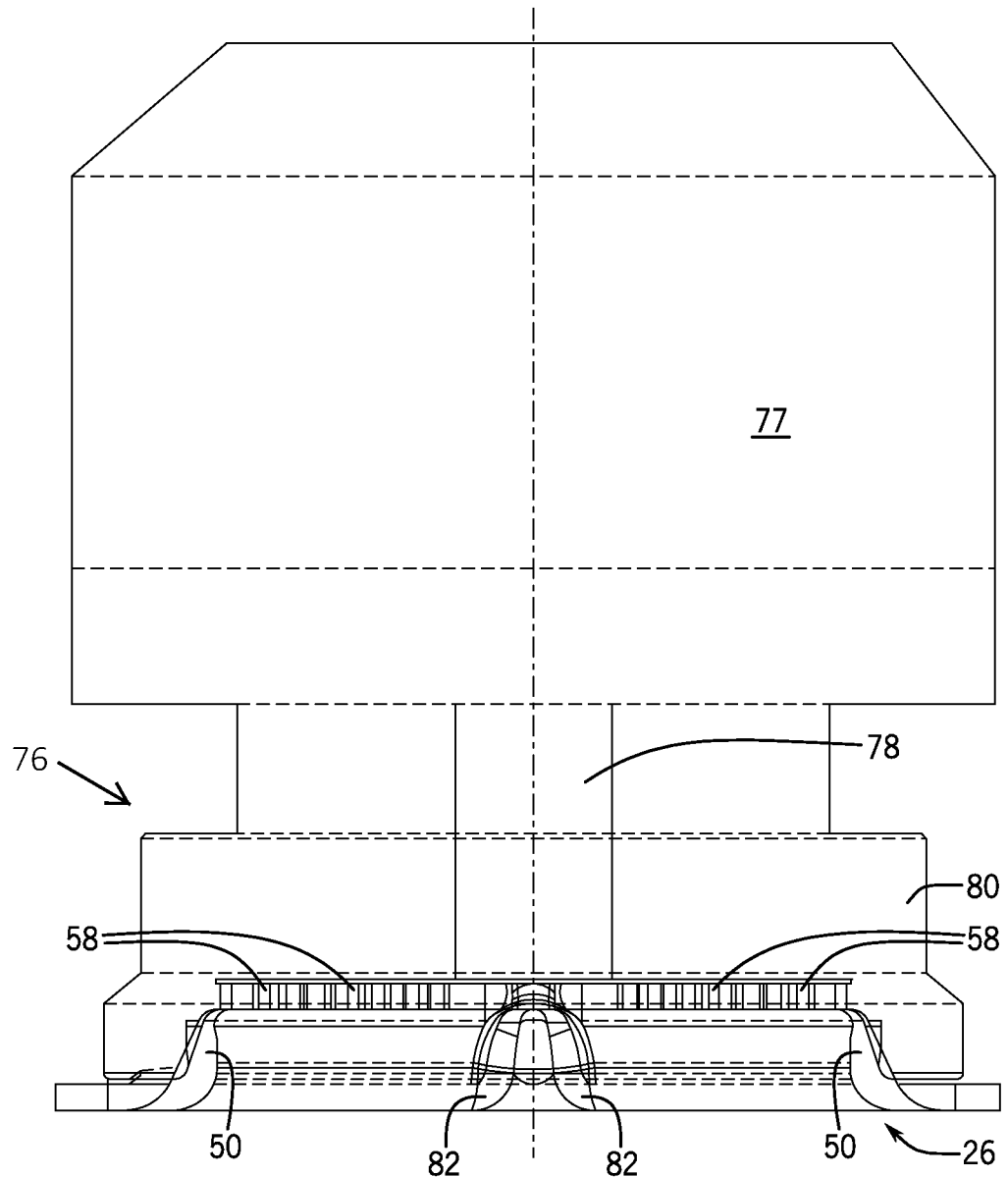
FIG. 9 is a partial cross section view of an anchor portion of the present invention engaged by a power tool arbor and connection device taken along line 9-9 in FIG. 6.
Figure 10:
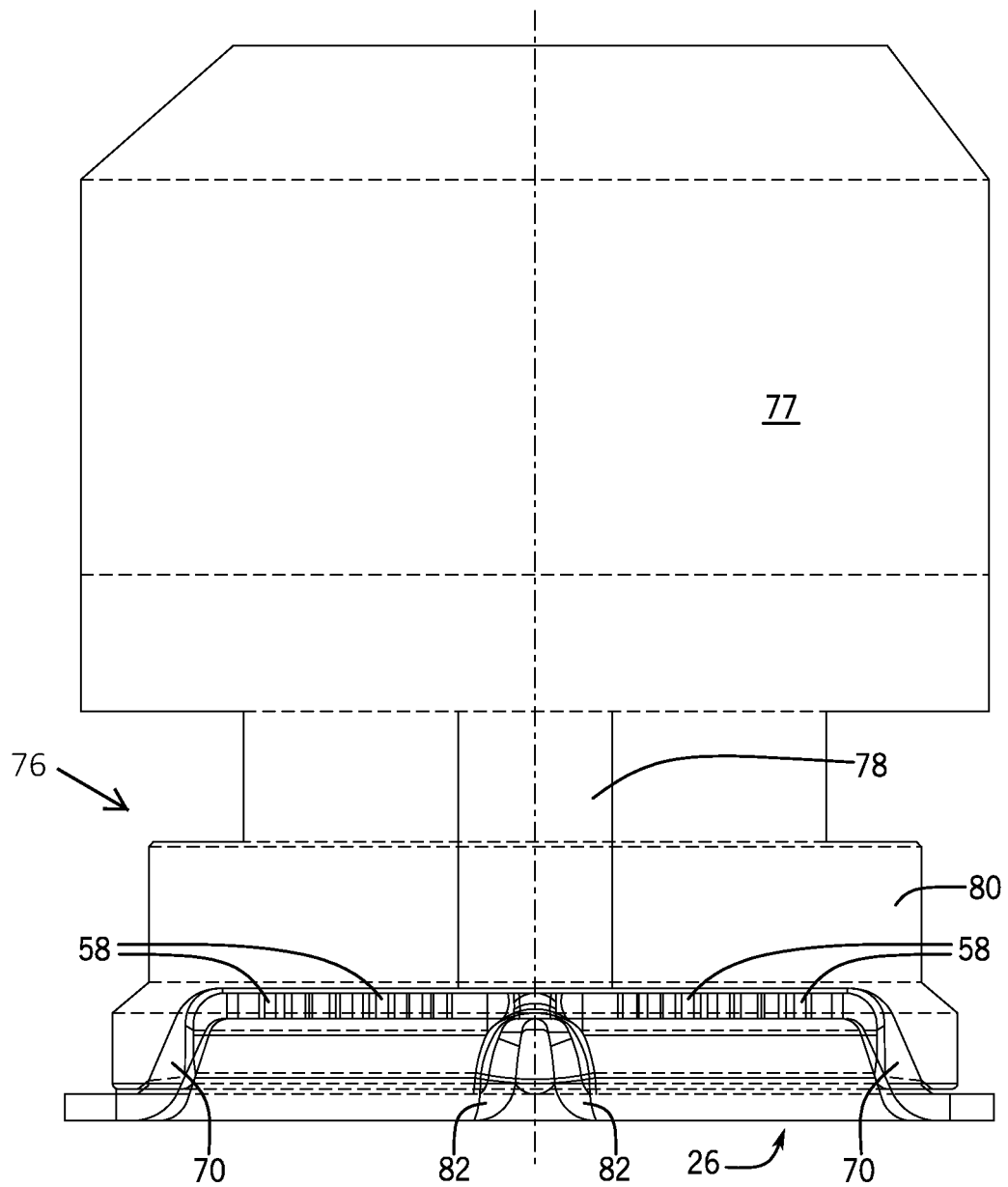
FIG. 10 is a partial cross section view of an anchor portion of the present invention engaged by a power tool arbor and connection device taken along line 10-10 in FIG. 6.

FIGS. 9 and 10 illustrate an example of an oscillating blade 20 engaged to a power tool connection device 76. The power tool 77 includes the connection device 76 having an arbor 78 with a clamp 80 disposed over the tool arbor engagement portion 26. The tool arbor engagement portion 26 is secured to the clamp 80 by a pair of spreading arms 82 that are closed when being inserted through the central arbor hole 60, but are spread, as seen in FIGS. 9 and 10, by a tool (not illustrated) that is either separate from or incorporated into a power tool.

FIG. 9 illustrates a cross section of the tool arbor engagement portion 26, the connection device arbor 78, clamp 80, and spreading arms 82. This portion of the tool arbor engagement portion 26 includes lock points 70 engaged with recesses in the clamp 80. FIG. 10, on the other hand, is a cross section taken at a location where there are no lock points.

The foregoing detailed description is provided for clearness of understanding only, and no unnecessary limitations therefrom should be read into the following claims.

The invention claimed is:

1. An oscillating saw blade comprising:
    an anchor disposed at least partially in a first plane and including:
        a working portion;
        a tool arbor engagement portion joined to the working portion, and the tool arbor engagement portion includes:

a side wall extending away from the first plane at essentially 90°, and the side wall includes an arcuate segment;

a cap wall joined to the side wall and disposed at least partially in a second plane, and the side wall and the cap wall at least partially define an arbor opening;

a first lock point joined to and extending radially outwardly from the side wall; and a second lock point joined to and extending radially outwardly from the side wall and spaced apart from the first lock point by an arcuate segment of the side wall, and the arcuate segment has an arc length greater than an arc length of the first lock point.

2. The oscillating saw blade of claim 1, wherein the side wall is formed integrally with the cap wall.

3. The oscillating saw blade of claim 1, wherein the cap wall defines an arbor engagement aperture.

4. The oscillating saw blade of claim 1, wherein the cap wall defines a plurality of arbor engagement apertures extending substantially radially from the arbor opening.

5. The oscillating saw blade of claim 1, wherein the first lock point extends substantially radially from the arbor opening.

6. The oscillating saw blade of claim 1, and further comprising:
a blade body joined to the working portion.

7. The oscillating saw blade of claim 1, wherein the cap wall further defines a radial engagement slot.

8. The oscillating saw blade of claim 1, wherein the working portion is disposed at least partially in a third plane.

9. The oscillating saw blade of claim 1, wherein the sidewall at least partially defines the arbor opening.

10. The oscillating saw blade of claim 1, wherein the first lock point is a snap-fitting lock point.

11. The oscillating saw blade of claim 1, wherein the first lock point and the second lock point are each a snap-fitting lock point.

12. The oscillating saw blade of claim 1, and further comprising:
a third lock point joined to and extending radially outwardly from the side wall and spaced apart from the first lock point by a second arcuate segment of the side wall, and the second arcuate segment has an arc length greater than an arc length of the first lock point.

13. The oscillating saw blade of claim 1, and further comprising:
a third lock point joined to and extending radially outwardly from the side wall and spaced apart from the second lock point by a second arcuate segment of the side wall, and the second arcuate segment has an arc length greater than an arc length of the second lock point.

14. The oscillating saw blade of claim 1, wherein the cap wall defines a plurality of arbor engagement apertures.

15. An oscillating power tool comprising:
a power tool connection clamp defining a clamp recess; and
an oscillating saw blade having:
an anchor disposed at least partially in a first plane and including:
a working portion;
a tool arbor engagement portion joined to the working portion, and the tool arbor engagement portion includes:
a side wall extending away from the first plane at essentially 90°, and the side wall includes an arcuate segment;
a cap wall joined to the side wall and disposed at least partially in a second plane, and the side wall and the cap wall at least partially define an arbor opening;
a first lock point joined to and extending radially outwardly from the side wall; and
a second lock point joined to and extending radially outwardly from the side wall and spaced apart from the first lock point by an arcuate segment of the side wall, and the arcuate segment has an arc length greater than an arc length of the first lock point.

16. The oscillating power tool of claim 15, wherein the side wall is formed integrally with the cap wall.

17. The oscillating power tool of claim 15, wherein the cap wall defines an arbor engagement aperture.

18. The oscillating power tool of claim 15, wherein the cap wall defines a plurality of arbor engagement apertures extending substantially radially from the arbor opening.

19. The oscillating power tool of claim 15, wherein the first lock point extends substantially radially from the arbor opening.

20. The oscillating power tool of claim 15, and further comprising:
a blade body joined to the working portion.

21. The oscillating power tool of claim 15, wherein the cap wall further defines a radial engagement slot.

22. The oscillating power tool of claim 15, wherein the working portion is disposed at least partially in a third plane.

23. The oscillating power tool of claim 15, wherein the sidewall at least partially defines the arbor opening.

24. The oscillating power tool of claim 15, wherein the first lock point is a snap-fitting lock point.

25. The oscillating power tool of claim 15, wherein the first lock point and the second lock point are each a snap-fitting lock point.

26. The oscillating power tool of claim 15, and further comprising:
a third lock point joined to and extending radially outwardly from the side wall and spaced apart from the first lock point by a second arcuate segment of the side wall, and the second arcuate segment has an arc length greater than an arc length of the first lock point.

27. The oscillating power tool of claim 15, and further comprising:
a third lock point joined to and extending radially outwardly from the side wall and spaced apart from the second lock point by a second arcuate segment of the side wall, and the second arcuate segment has an arc length greater than an arc length of the second lock point.

28. The oscillating power tool of claim 15, wherein the cap wall defines a plurality of arbor engagement apertures.

* * * * *